(12) United States Patent
Durnil et al.

(10) Patent No.: US 12,530,851 B2
(45) Date of Patent: Jan. 20, 2026

(54) AUGMENTED REALITY ENHANCED MEDIA

(71) Applicant: QUALCOMM Incorporated, San Diego, CA (US)

(72) Inventors: David Durnil, Carlsbad, CA (US); Todd Lemoine, San Diego, CA (US); Murali Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 18/061,372

(22) Filed: Dec. 2, 2022

(65) Prior Publication Data
US 2024/0161418 A1    May 16, 2024

Related U.S. Application Data

(60) Provisional application No. 63/425,276, filed on Nov. 14, 2022.

(51) Int. Cl.
*G06T 19/00*     (2011.01)
*G06F 3/14*      (2006.01)

(52) U.S. Cl.
CPC .......... *G06T 19/006* (2013.01); *G06F 3/1423* (2013.01)

(58) Field of Classification Search
CPC ............................ G06T 19/006; G06F 3/1423
See application file for complete search history.

(56) References Cited

U.S. PATENT DOCUMENTS 9,798,385 B1 * 10/2017 Das ...................... H04L 67/535
2019/0065026 A1 * 2/2019 Kiemele ................. A63F 13/92
2022/0326967 A1 * 10/2022 Khan .................... G06F 3/1423

OTHER PUBLICATIONS

International Search Report and Written Opinion—PCT/US2023/078620—ISA/EPO—Feb. 12, 2024.

* cited by examiner

Primary Examiner — Grace Q Li
(74) Attorney, Agent, or Firm — QUALCOMM Incorporated

(57) ABSTRACT

Systems and techniques for displaying augmented reality enhanced media content are disclosed. For instance, a process can include displaying media content on one or more displays. The process can include: generating a first media content element for an application engine associated with an application state of the application engine; generating a second media content element for the application engine associated with the application state of the application engine; displaying, on a first display of a first device, the first media content element; and outputting the second media content element for display on a second display of a second device relative to a pose of the first display of the first device.

32 Claims, 11 Drawing Sheets

AUGMENTED REALITY ENHANCED MEDIA

CROSS-REFERENCE TO RELATED APPLICATIONS

The present application claims the benefit of U.S. Provisional Application No. 63/425,276, filed Nov. 14, 2022, entitled "AUGMENTED REALITY ENHANCED MEDIA," which is hereby incorporated by reference in its entirety and for all purposes.

FIELD

This application is related to enhancing media with augmented reality. For example, aspects of the application relate to systems and techniques of augmenting media content displayed on a first display of a first device with augmented reality media content displayed on a second display of a second device.

BACKGROUND

Degrees of freedom (DoF) refer to the number of basic ways a rigid object can move through three-dimensional (3D) space. In some examples, six different DoF can be tracked. The six DoF include three translational DoF corresponding to translational movement along three perpendicular axes, which can be referred to as x, y, and z axes. The six DoF include three rotational DoF corresponding to rotational movement around the three axes, which can be referred to as pitch, yaw, and roll. Some extended reality (XR) devices, such as virtual reality (VR) or augmented reality (AR) headsets, can track some or all of these degrees of freedom. For instance, a 3DoF XR headset typically tracks the three rotational DoF, and can therefore track whether a user turns and/or tilts their head. A 6DoF XR headset tracks all six DoF, and thus also tracks a user's translational movements.

XR systems typically use powerful processors to perform feature analysis (e.g., extraction, tracking, etc.) and other complex functions quickly enough to display an output based on those functions to their users. Powerful processors generally draw power at a high rate. Similarly, sending large quantities of data to a powerful processor typically draws power at a high rate. Headsets and other portable devices typically have small batteries so as not to be uncomfortably heavy to users. Thus, some XR systems must be plugged into an external power source, and are thus not portable. Portable XR systems generally have short battery lives and/or are uncomfortably heavy due to inclusion of large batteries.

SUMMARY

Systems and techniques are described herein for displaying augmented reality enhanced media content. According to at least one example, a method is provided for displaying media content on one or more displays. The method includes: generating a first media content element for an application engine associated with an application state of the application engine; generating a second media content element for the application engine associated with the application state of the application engine; displaying, on a first display of a first device, the first media content element; and outputting the second media content element for display on a second display of a second device relative to a pose of the first display of the first device.

In another example, an apparatus for displaying media content on one or more displays is provided that includes at least one memory and at least one processor coupled to the at least one memory. The at least one processor is configured to: generate a first media content element for an application engine associated with an application state of the application engine; generate a second media content element for the application engine associated with the application state of the application engine; displaying, on a first display of a first device, the first media content element; and output the second media content element for display on a second display of a second device relative to a pose of the first display of the first device.

In another example, a non-transitory computer-readable medium is provided that has stored thereon instructions that, when executed by one or more processors, cause the one or more processors to: generate a first media content element for an application engine associated with an application state of the application engine; generate a second media content element for the application engine associated with the application state of the application engine; displaying, on a first display of a first device, the first media content element; and output the second media content element for display on a second display of a second device relative to a pose of the first display of the first device.

In another example, an apparatus for displaying media content on one or more displays is provided. The apparatus includes: means for generating a first media content element for an application engine associated with an application state of the application engine; means for generating a second media content element for the application engine associated with the application state of the application engine; displaying, on a first display of a first device, the first media content element; and means for outputting the second media content element for display on a second display of a second device relative to a pose of the first display of the first device.

According to at least one example, a method is provided for displaying media content on one or more displays. The method includes: obtaining an application state of an application engine from a first device comprising a first display; generating a media content element associated with the application state of the application engine for a second device comprising a second display; and displaying, on the second display of the second device, the media content element relative to a pose of the first display of the first device.

In another example, an apparatus for displaying media content on one or more displays is provided that includes at least one memory and at least one processor coupled to the at least one memory. The at least one processor is configured to: obtain an application state of an application engine from a first device comprising a first display; generate a media content element associated with the application state of the application engine for a second device comprising a second display; and displaying, on the second display of the second device, the media content element relative to a pose of the first display of the first device.

In another example, a non-transitory computer-readable medium is provided that has stored thereon instructions that, when executed by one or more processors, cause the one or more processors to: obtain an application state of an application engine from a first device comprising a first display; generate a media content element associated with the application state of the application engine for a second device comprising a second display; and displaying, on the second display of the second device, the media content element relative to a pose of the first display of the first device.

In another example, an apparatus for displaying media content on one or more displays is provided. The apparatus includes: means for obtaining an application state of an application engine from a first device comprising a first display; means for generating a media content element associated with the application state of the application engine for a second device comprising a second display; and displaying, on the second display of the second device, the media content element relative to a pose of the first display of the first device.

In some aspects, the apparatus comprises a camera, a mobile device (e.g., a mobile telephone or so-called "smart phone" or other mobile device), a wireless communication device, a wearable device, an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
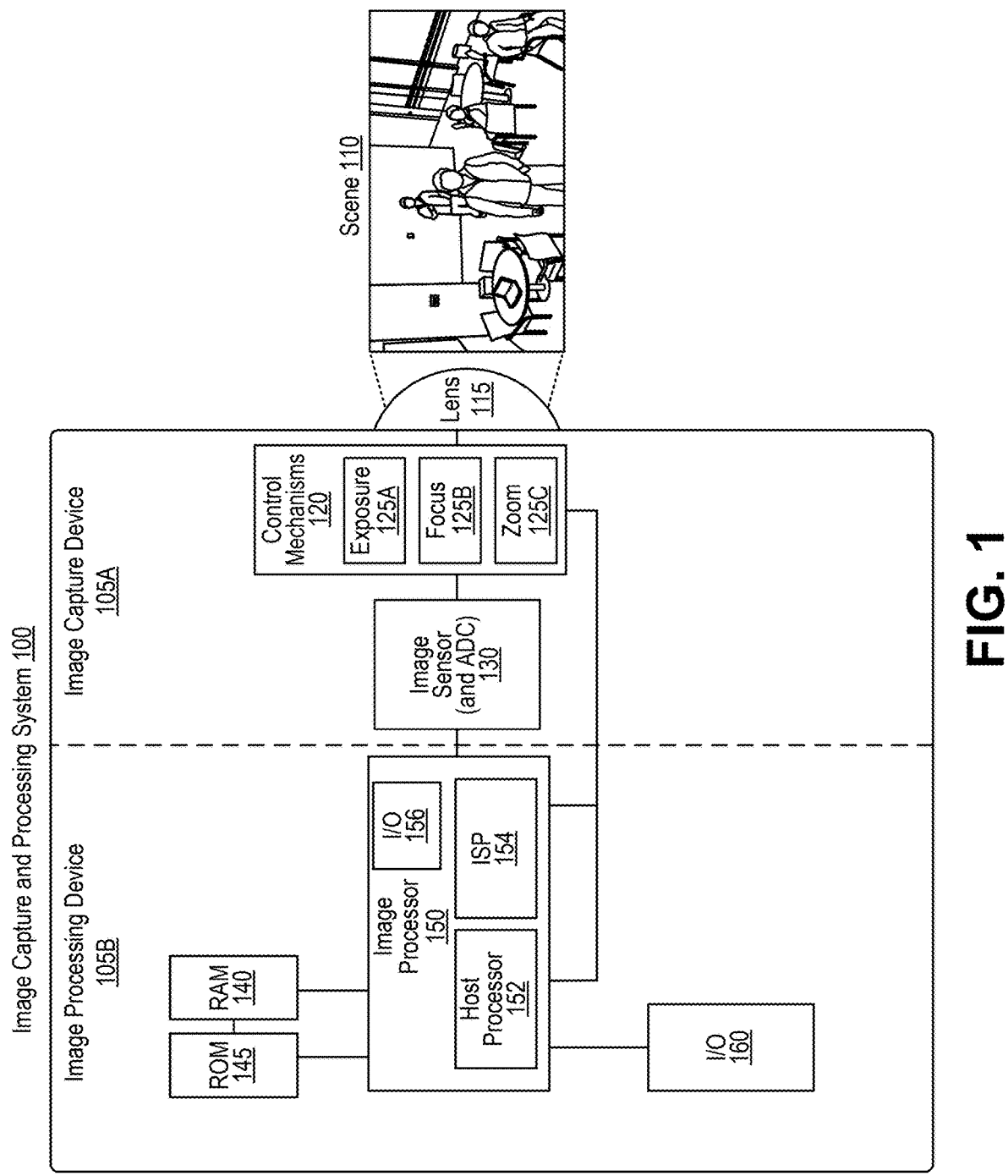
FIG. 1 is a block diagram illustrating an architecture of an image capture and processing device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," "video frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. As used herein, the terms XR system and XR device are used interchangeably. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In the context of systems that track movement through an environment, such as XR systems and/or VSLAM systems, degrees of freedom can refer to which of the six degrees of freedom the system is capable of tracking. 3DoF systems generally track the three rotational DoF—pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

Systems that track movement through an environment, such as XR systems and/or VSLAM systems, generally include powerful processors. These powerful processors can be used to perform complex operations quickly enough to display an up-to-date output based on those operations to the users of these systems. Such complex operations can relate to feature tracking, 6DoF tracking, VSLAM, rendering virtual objects to overlay over the user's environment in XR, animating the virtual objects, and/or other operations discussed herein. Powerful processors typically draw power at a high rate. Sending large quantities of data to powerful processors typically draws power at a high rate, and such systems often capture large quantities of sensor data (e.g., images, location data, and/or other sensor data) per second. Headsets and other portable devices typically have small batteries so as not to be uncomfortably heavy to users. Thus, typical XR headsets either must be plugged into an external power source, are uncomfortably heavy due to inclusion of large batteries, or have very short battery lives.

Currently the visual elements of gameplay on mobile devices are constrained to what can be shown on the physical display of the device itself. In most cases the mobile device displays are relatively small and occupy a small fraction of the player's field of view. Modern games are required to present the game user interface (UI), and visual representation of the game itself on the same display surface, often resulting in cluttered, small, and difficult to interact with user interfaces obscuring the game and frustrating players. Furthermore, the small displays of mobile devices limit player immersion in gaming experiences. With so little of the user field of view connected to the game being played it's easier for gamers to detach from the game experience and become distracted or bored.

As described in more detail herein, systems, apparatuses, methods (also referred to as processes, and computer-readable media (collectively referred to herein as "systems and techniques") are described herein for enhancing the display of media content with augmented reality media content.

A user of an XR system (e.g., an AR device) may sometimes wear the XR system while the user is interacting with another electronic device (e.g., e.g., a mobile device, smart phone, a tablet, or the like). In some cases, the XR system and the electronic device can be configured to simultaneous display media content (e.g., displaying still images, video frames, or the like) on both the XR system and the electronic device. In one illustrative example, a user may wear an XR system while playing a video game on a mobile device (e.g., a smart phone). In some cases, the XR system can display game content in addition to the game content displayed on the display of the smart phone. In some case, the XR system can display game content oriented relative to a display of the smart phone to create the appearance that the display of the smart phone is extended beyond the true physical display area. In some cases, the XR system can display effects (e.g., fog, explosions, particles, etc.). For example, an explosion displayed by the XR system may have the appearance of originating at the display of the mobile device and extending outside of the display area of the mobile device to create a three-dimensional effect.

In some examples, the XR system can be coupled (e.g., by wire, wirelessly, or any combination thereof) with the mobile device. In some implementations, media content (e.g., rendered frames) for the game on both the mobile device and the XR system can be generated by a game engine natively. For example, the game engine can include parallel pipelines for rendering elements of the gameplay simulation for each of the XR system and the mobile device.

In some implementations, game media content for the mobile device and the XR system can be generated by rendered of different applications. For example, a game application can generate media content (e.g., by a game engine renderer) for the mobile device. In parallel, a companion application can generate media content (e.g., by an XR rendered) for the XR system. In some cases, the game application and the companion application can include communication modules for communication between the applications. For example, game data and/or game assets can be transmitted from the game application to the companion application. In some cases, inputs from the XR system can be transmitted from the companion application to the gaming application.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
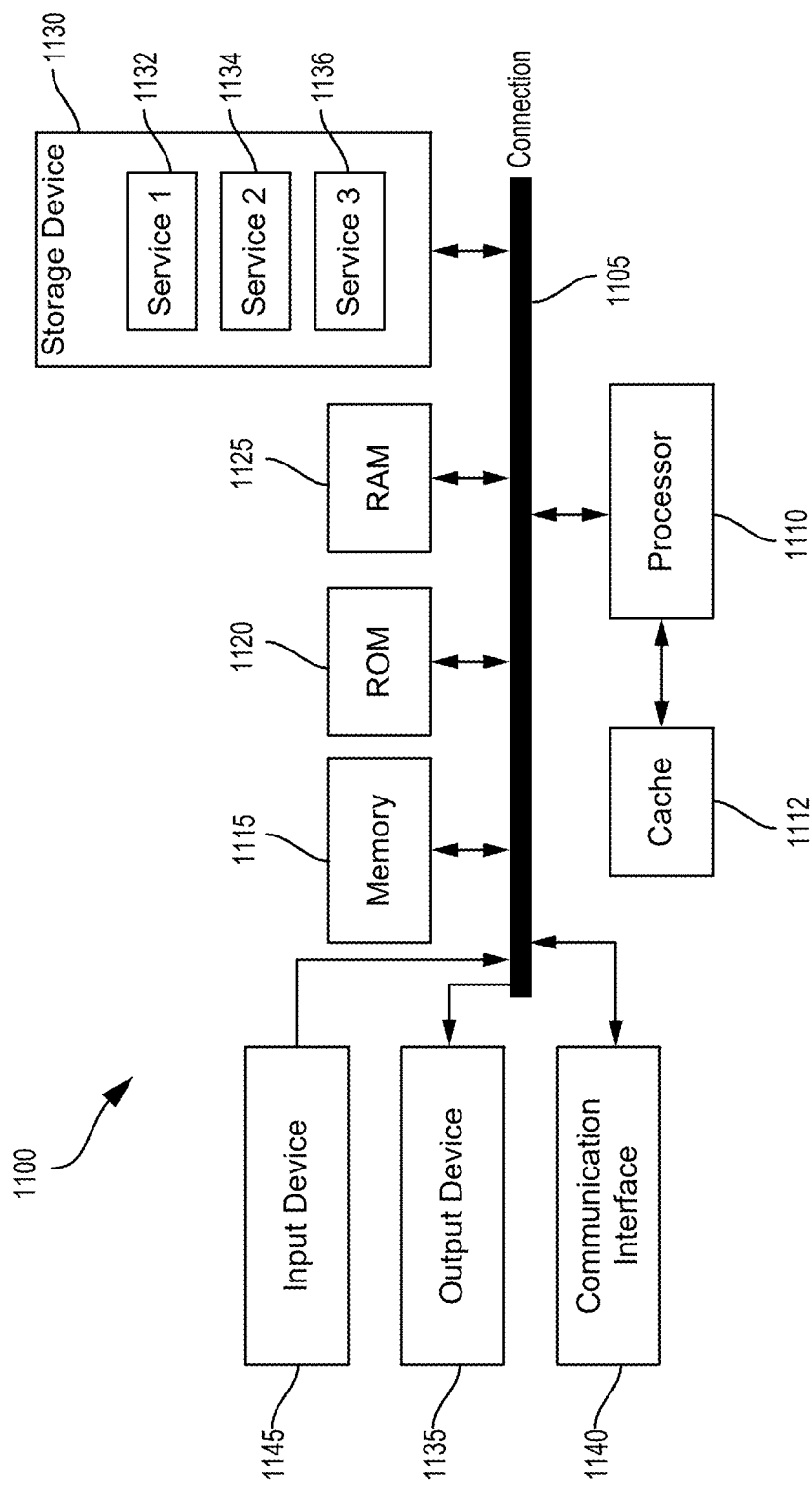
FIG. 11 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1110 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1125, read-only memory (ROM) 145/1120, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1135, any other input devices 1145, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
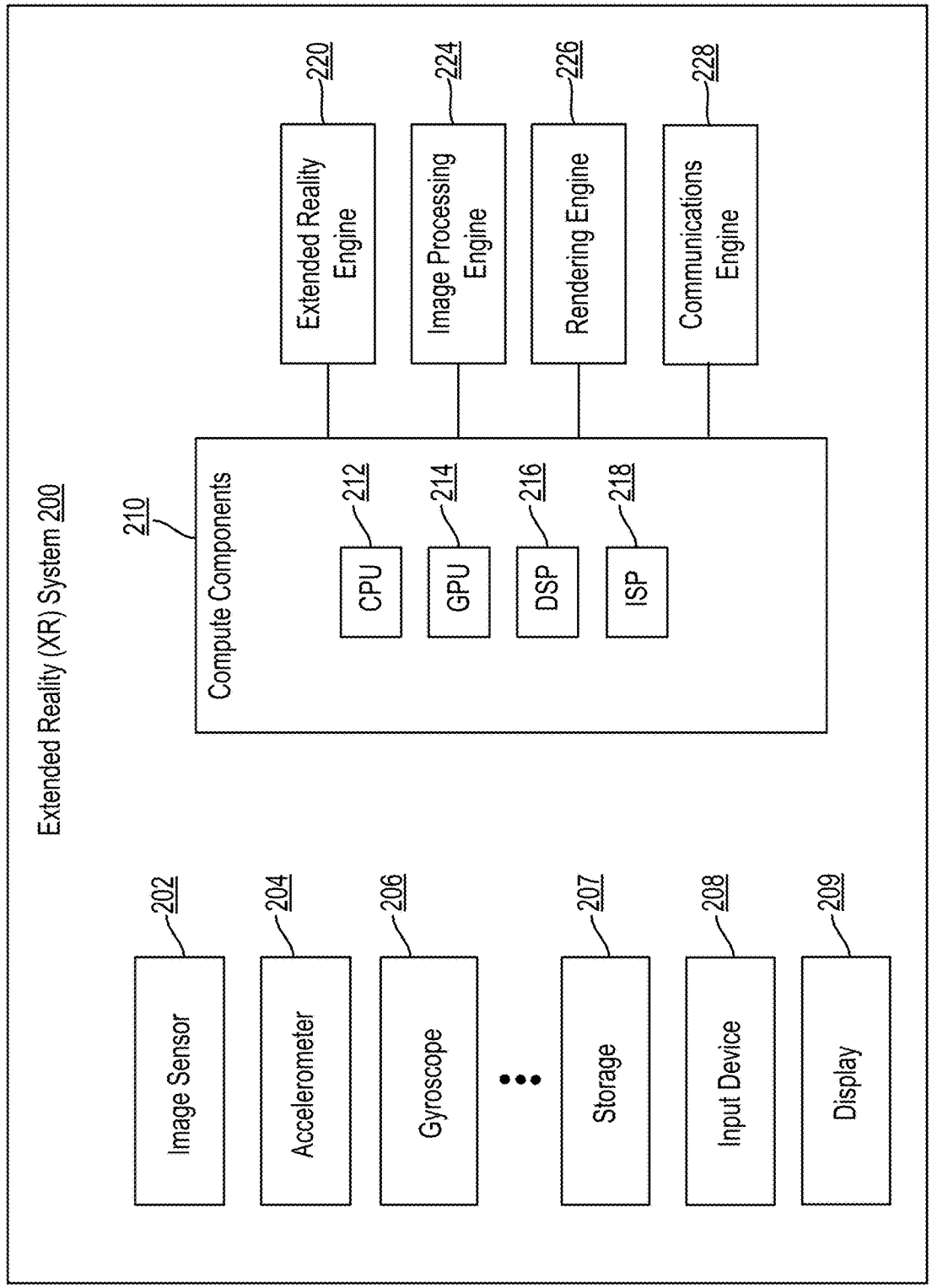
FIG. 2 is a block diagram illustrating an architecture of an example extended reality (XR) system, in accordance with some examples of the present disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example XR system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1145 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1140 of FIG. 11.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 210 can extract feature points corresponding to a mobile device (e.g., mobile device 440 of FIG. 4, mobile device 540 of FIG. 5), or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
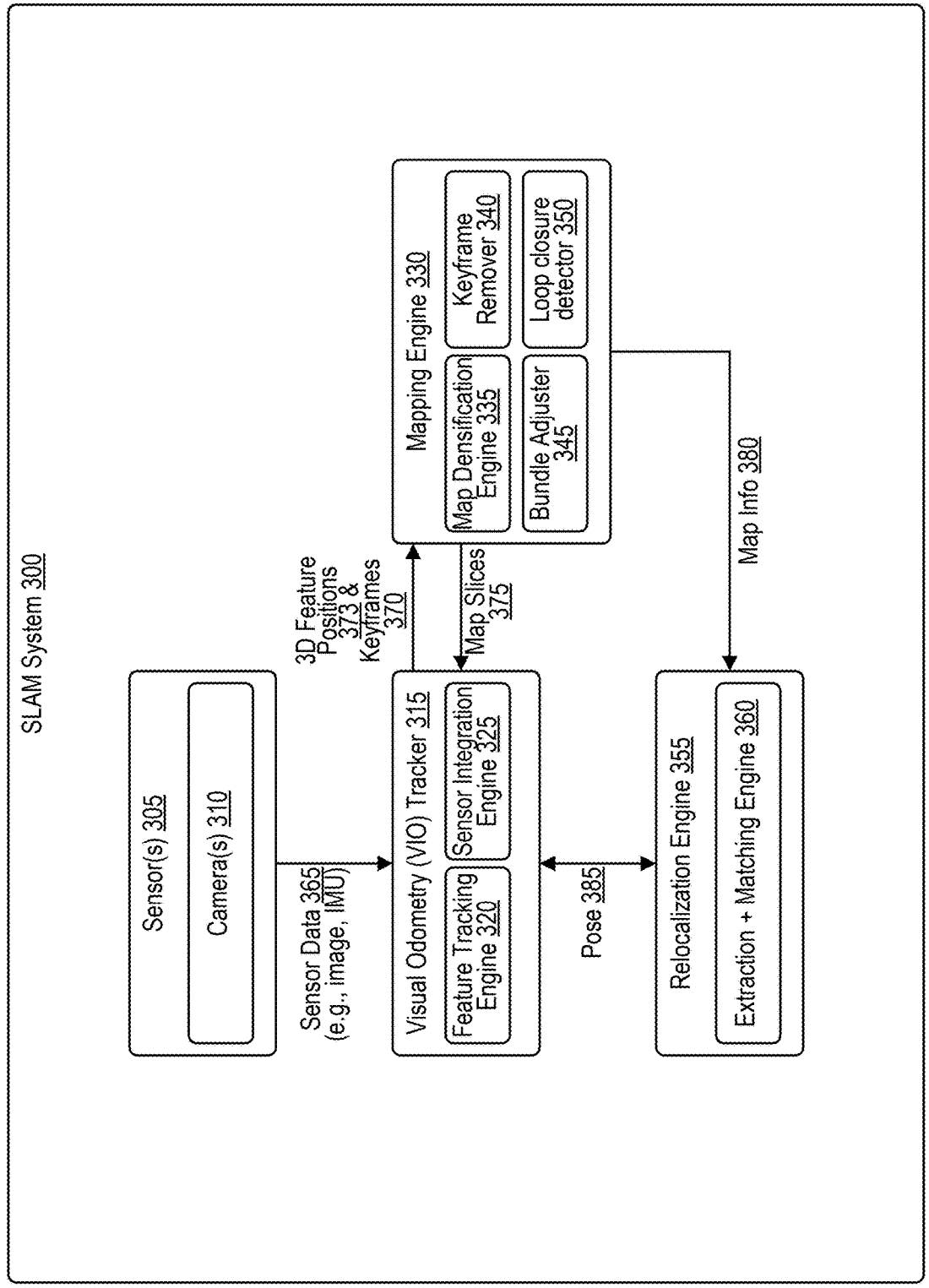
FIG. 3 is a block diagram illustrating an architecture of a simultaneous localization and mapping (SLAM) device, in accordance with some examples of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 373 of a particular feature. The 3D feature positions 373 can include one or more 3D feature positions and can also be referred to as 3D feature points. The 3D feature positions 373 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 373 of the particular feature when considered by the feature tracking engine 320 and/or the sensor integration engine 325 for determination of the 3D feature positions 373. In some examples, a keyframe corresponding to a particular feature also includes data about the pose 385 of the SLAM system 300 and/or the camera(s) 310 during capture of the keyframe. In some examples, the VIO tracker 315 can send 3D feature positions 373 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 373 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 373. The map information 380 can include one or more keyframes 370 corresponding to certain features and certain 3D feature positions 373.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 373, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Figure 4:
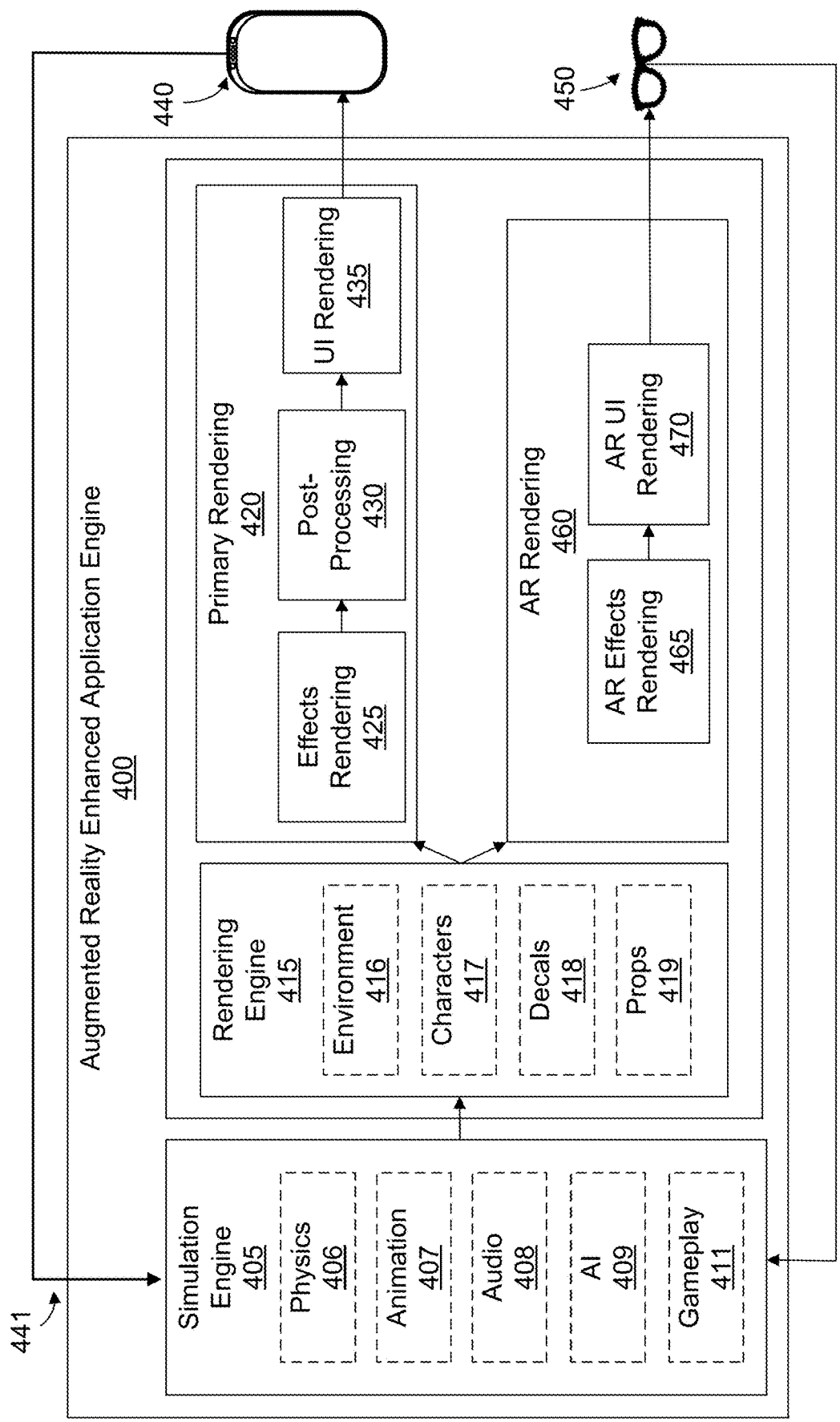
FIG. 4 is a block diagram illustrating an architecture of an augmented reality enhanced application engine, in accordance with some examples of the present disclosure.

FIG. 4 illustrates an example of an augmented reality enhanced application engine 400. In the illustrative example, the augmented reality enhanced application engine 400 includes a simulation engine 405, a rendering engine 415, a primary rendering module 420, and AR rendering module 460. As illustrated, the primary rendering module 420 can include an effects rendering engine 425, rendering engine 415, a post-processing engine 430, and a UI rendering engine 435. The AR rendering module 460 can include an AR effects rendering engine 465 and an AR UI rendering engine 470. It should be noted that the components 405-470 shown in FIG. 4 are non-limiting examples provided for illustrative and explanation purposes, and other examples can include more, fewer, or different components than those shown in FIG. 4.

In some cases, the augmented reality enhanced application engine 400 is included in and/or is in communication with (wired or wirelessly) an electronic device 440. In some examples, the augmented reality enhanced application engine 400 is included in and/or is in communication with (wired or wirelessly) an XR system 450. In one illustrative example, the XR system can be XR glasses as illustrated in FIG. 4.

In the illustrated example of FIG. 4, the simulation engine 405 can generate a simulation for the augmented reality enhanced application engine 400. In some implementations, the simulation engine 405 can optionally include at least one or more of a physics module 406, an animation module 407, an audio module 408, an artificial intelligence (AI) module 409, or a gameplay module 411. In some cases, the simulation can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrahedrons, other polyhedrons, rounded polyhedrons with one or more rounded edges and/or corners, portions thereof, or combinations thereof), textures for shapes, bump-mapping for shapes, lighting effects, or combinations thereof. In some examples, the simulation can include at least a portion of an environment. The environment may be a real-world environment, a virtual environment, and/or a mixed environment that includes real-world environment elements and virtual environment elements.

In some cases, the physics module 406 can simulate physics for objects within the virtual environment. For example, the physics module 406 can simulate the effects of gravity, collisions, fluid dynamics, any other physics and/or any combination thereof for the simulation. In some cases, the animation module 407 can generate animation effects for the simulation. In some aspects, the animation module 407 may be used to provide the appearance of motion of an object by varying a texture. For example, the animation module 407 can apply different textures to a character model in a 2D environment that produce the appearance of motion (e.g., by applying sprites where limbs of the character model are in different positions). In some cases, the animation module 407 can vary the geometry of an object to provide the appearance of motion of the object.

In some examples, an audio module 408 of the simulation engine 405 can generate audio for the simulation. For example, the audio module 408 can play music, sound effects, voices, any other sounds, and/or any combination thereof.

In some aspects, the AI module 409 can generate behavior of objects (e.g., people, animals, vehicles, electronic devices, or the like) for the simulation. In one illustrative example, in the case of a video game simulation, the module 409 can generate the behavior of non-player characters. Some example behaviors can include movement patterns, dialogue content, or the like.

In some cases, a gameplay module 411 can generate, retrieve, store, and/or update a gameplay state for the simulation. In some cases, the gameplay module 411 can track gameplay progress, player character position, player inventory, any other gameplay content and/or any combination thereof.

In some cases, the simulation generated by the simulation engine 405 can be dynamic. For example, the simulation engine 405 can update the simulation based on different triggers, including, without limitation, physical contact, sounds, gestures, input signals, passage of time, and/or any combination thereof. As used herein, an application state of the augmented reality enhanced application engine 400 can include any information associated with the simulation engine 405, rendering engine 415, primary rendering module 420, effects rendering engine 425, post-processing engine 430, UI rendering engine 435, AR rendering module 460, AR effects rendering engine 465, AR UI rendering engine 470, inputs to the augmented reality enhanced application engine 400, outputs from the augmented reality enhanced application engine 400, and/or any combination thereof at a particular moment in time.

As illustrated, the simulation engine 405 can obtain mobile device input 441 from the mobile device 440. In some cases, the simulation engine 405 can obtain XR system input 451 from the XR system 450. The mobile device input 441 and/or XR system input 451 can include, for example, user input through a user interface of the application displayed on the display of the mobile device 440, user inputs from an input device (e.g., input device 208 of FIG. 2), one or more sensors (e.g., image sensor 202, accelerometer 204, gyroscope 206 of FIG. 2). In some cases, simulation engine 405 can update the application state for the augmented reality enhanced application engine 400 based on the mobile device input 441, XR system input 451, and/or any combination thereof.

In the illustrative example of FIG. 4, the rendering engine 415 can obtain application state information from the simulation engine 405. In some implementations, the rendering engine 415 can optionally include at least one or more of an environment module 416, character module 417, a decal module 418, or a props module 419. In some implementations, the environment module can render the environment (e.g., buildings, landscapes, trees, etc.) that an application (e.g., a game, virtual world) is simulating. In some aspects, the character module 417 can render playable and/or non-player characters for the simulation. In some examples, the decal module 418 can render details that are overlaid onto portions of the environment (e.g., footprints, damage to objects, or the like). In some cases, the props module 419 can render dynamic elements related to the simulation. For example, in the case of a game, the props module 419 can render inventory items (e.g., health kits, weapons, tools, etc.)

In some cases, the rendering engine 415 can determine portions of the application state information to be rendered by the displays available to the augmented reality enhanced application engine 400. In some implementations, the modules 416-419 of the rendering engine 415 can be configured to determine different types of content from the simulation to be rendered by the displays available to the augmented reality enhanced application engine 400. For example, the rendering engine 415 can determine whether a connection (wired or wireless) has been established between the XR system 450 and the mobile device 440. In some cases, the rendering engine 415 can determine the application state information to be rendered by the primary rendering module 420 and the AR rendering module 460. In some cases, the rendering engine 415 can determine that the XR system 450 is not connected (wired or wirelessly) to the mobile device 440. In some cases, the rendering engine 415 can determine the application state information for the primary rendering module 420 and forego determining application state information to be rendered by the AR rendering module 460 that will not be displayed. Accordingly, the rendering engine 415 can facilitate an adaptive rendering configuration for the augmented reality enhanced application engine 400 based on the availability and/or types of available displays. In some implementations, a separate rendering engine 415 as shown in FIG. 4 may be excluded. In one illustrative example, the primary rendering module 420 and/or AR rendering module 460 can include at least a portion of the functionality of the rendering engine 415 described above.

The primary rendering module 420 can include an effects rendering engine 425, post-processing engine 430, and UI rendering engine 435. In some cases, the primary rendering module 420 can render image frames configured for display on a display of the mobile device 440. As illustrated, the primary rendering module 420 can output the generated image frames (e.g., media content) to be displayed on a display of the mobile device 440. In some cases, the effects rendering information can render application state information generated by the simulation engine 405. For example, the effects rendering engine 425 can generate a 2D projection of a portion of a 3D environment included in the application state information. For example, the primary rendering module 420 may generate a perspective projection of the 3D environment by a virtual camera. In some cases, the application state information can include a pose of the virtual camera within the environment. In some cases, the effects rendering engine 425 can generate additional visual effects that are not included within the 3D environment. For example, the effects rendering engine 425 can apply texture maps to enhance the visual appearance of the effects generated by the rendering engine 415. In some cases, the primary rendering module 420 can exclude portions of the application state information designated for the AR rendering module 460 by the rendering engine 415. For example, the primary rendering module 420 may exclude effects present in the environment of the simulation.

In some cases, post-processing engine 430 can provide additional processing to the rendered effects generated by the effects rendering engine 425. For example, the post-processing engine 430 can perform scaling, image smoothing, z-buffering, contrast enhancement, gamma, color mapping, any other image processing, and/or any combination thereof.

Figure 6:
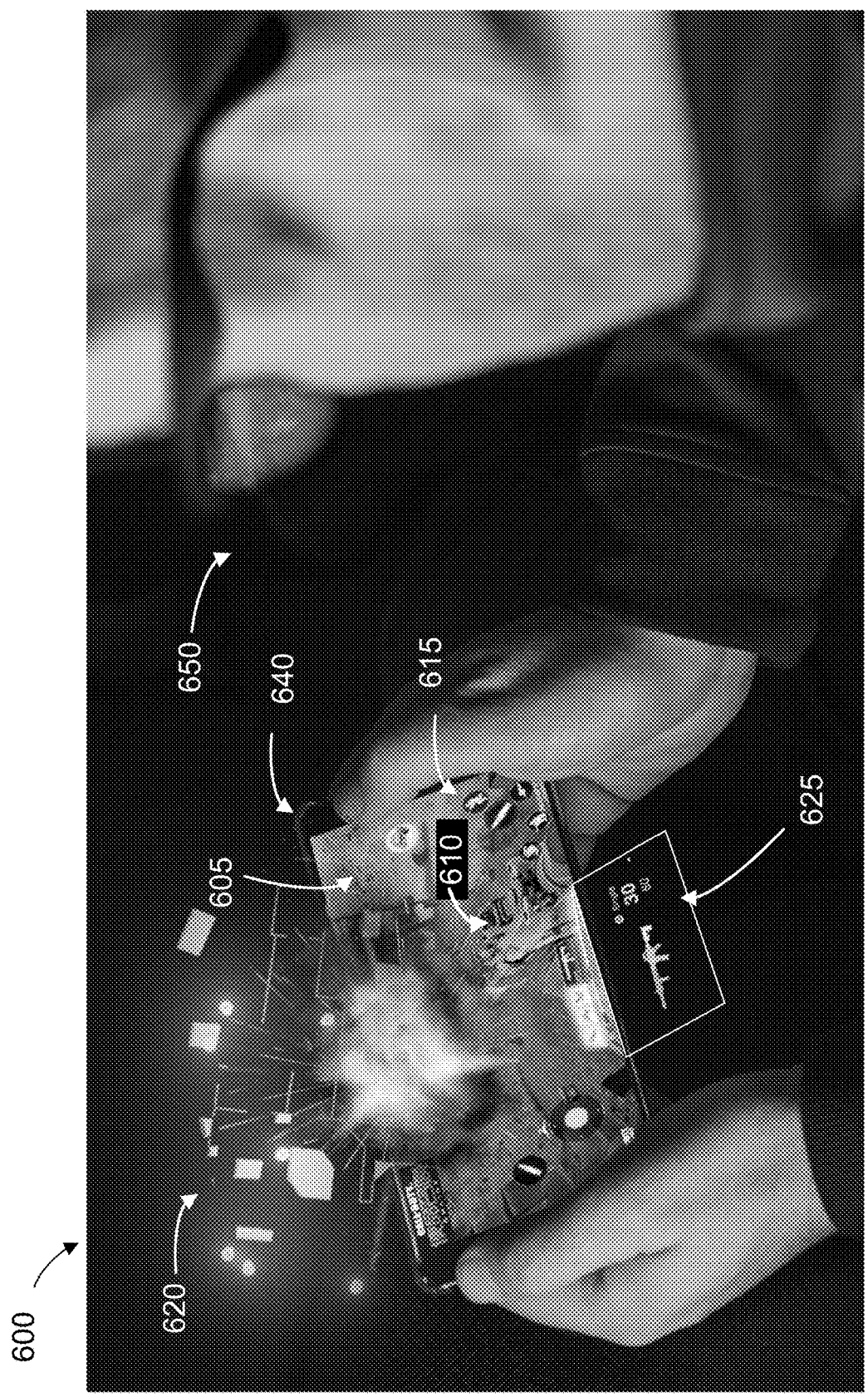
FIG. 6 is a diagram illustrating an example of a video game with augmented reality enhancements, in accordance with some examples of the present disclosure.

In some implementations, UI rendering engine 435 can render a UI (e.g., UI 615 of FIG. 6). In some cases, the user interface can provide application state information in addition to the effects rendered based on the application environment (e.g., a 3D environment). In some cases, the UI can be generated as an overlay over a portion of the image frame output by the post-processing engine 430.

The AR rendering module 460 can include an AR effects rendering engine 465 and an AR UI rendering engine 470. In some cases, the AR effects rendering engine 465 can render application state information generated by the simulation engine 405. For example, the AR effects rendering engine 465 can generate a 2D projection of a 3D environment included in the application state information. In some cases, the AR effects rendering engine 465 can generate effects that appear to protrude out from the display surface of the display of the mobile device 440.

In some cases, the display of the XR system 450 can have different display parameters (e.g., a different resolution, frame rate, aspect ratio, and/or any other display parameters) than the display of the mobile device 440. In some cases, the display parameters can also vary between different types of output devices (e.g., different HMD models, other XR systems, or the like). In some cases, inclusion of the AR rendering module 460 within the augmented reality enhanced application engine 400 can require periodic updates to provide compatibility with different devices.

Figure 5:
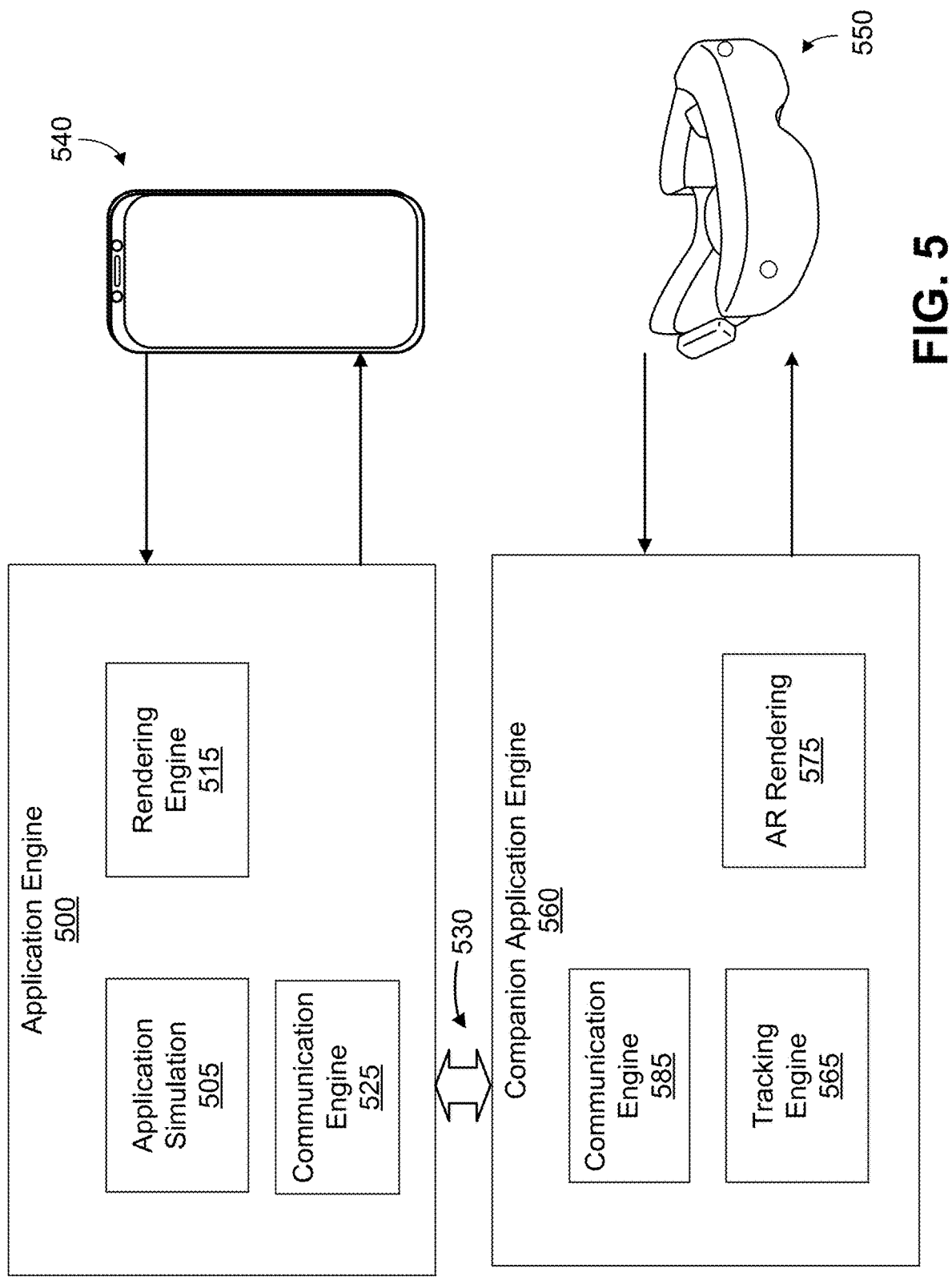
FIG. 5 is a block diagram illustrating an architecture of an application engine and an augmented reality companion engine, in accordance with some examples of the present disclosure.

FIG. 5 illustrates an example of a primary application 500 and a companion application 560 that can provide an augmented reality enhancement to the primary application 500. In the illustrative example of FIG. 5, the primary application 500 includes a simulation engine 505, a rendering engine 515, and a communication engine 525. In the illustrated example, the companion application 560 includes a tracking engine 565 (e.g., XR engine 220 of FIG. 2, VIO tracker 315 of FIG. 3), an AR rendering engine 575, and a communication engine 585. As illustrated the primary application 500 and companion application 560 can communicate over a (wired or wireless) communications link 530. It should be noted that the components 505-525 shown in the primary application 500 of FIG. 5 are non-limiting examples provided for illustrative and explanation purposes, and other examples can include more, fewer, or different components than those shown in FIG. 5. Similarly, it should be noted that the components 565-585 shown in the companion application 560 of FIG. 5 are non-limiting examples provided for illustrative and explanation purposes, and other examples can include more, fewer, or different components than those shown in FIG. 5.

In the illustrated example of FIG. 5, the simulation engine 505 of primary application 500 can generate a simulation for an application on the mobile device 540. In some cases, the simulation can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrahedrons, other polyhedrons, rounded polyhedrons with one or more rounded edges and/or corners, portions thereof, or combinations thereof), textures for shapes, bump-mapping for shapes, lighting effects, or combinations thereof. In some examples, the simulation can include at least a portion of an environment. The environment may be a real-world environment, a virtual environment, and/or a mixed environment that includes real-world environment elements and virtual environment elements.

In some cases, the simulation generated by the simulation engine 505 can be dynamic. For example, the simulation engine 505 can update the simulation based on different triggers, including, without limitation, physical contact, sounds, gestures, input signals, passage of time, and/or any combination thereof. As used herein, an application state of the primary application 500 can include any information associated with the simulation engine 505, effects rendering engine 515, communication engine 525, and/or any combination thereof at a particular moment in time.

In some cases, the rendering engine 515 can correspond to the rendering engine 415, the primary rendering module 420, the AR rendering module 460, of FIG. 4 and/or any combination thereof and perform similar functions. For example, the rendering engine 515 can include modules for effects rendering (e.g., effects rendering engine 425 of FIG. 4), post-processing (e.g., post-processing engine 430 of FIG. 4), and/or UI rendering (e.g., UI rendering engine 435 of FIG. 4).

The communication engine 525 of the primary application 500 and the communication engine 585 of the companion application 560 can communicate over a communications link 530. In some cases, the communications link 530 can be bidirectional. In some examples, the communication engine 525 can transmit application state information (e.g., from the simulation engine 505) to the communication engine 585 of the 560. In some cases, the application state information can include information that can be used to generate AR effects. In some examples, the application state information can include data that can be used by the companion application 560 to generate an AR UI. In some cases, the communication engine 525 can also transmit inputs obtained from the 540 over the communications link 530 to the communication engine 585. In some cases, the communication engine 585 of the companion application 560 can transmit pose information, connectivity status, user inputs, or the like to the communication engine 525 of the primary application 500. The communication engine 525 and communication engine 585 can also transmit and/or receive synchronization signals for synchronizing display between a display of the mobile device 540 and a display of the HMD 550. The examples of communications between the communication engine 525 and communication engine 585 provided herein are non-limiting and provided as examples. In some cases, more, fewer, and/or different information can be communicated over the communications link 530 without departing from the scope of the present disclosure.

Referring to the companion application 560, the tracking engine 565 can perform tracking (e.g., SLAM, VIO) using information captured by sensors (e.g., image sensor 202, accelerometer 204, gyroscope 206 of FIG. 2, one or more sensors 305, cameras 310 of FIG. 3, or the like). In some cases, tracking engine 565 can determine a pose of the mobile device 540, a pose of the HMD 550, an environment map, or the like. In some aspects, the tracking engine 565 can determine a contour of a display of the mobile device 540. In some cases, the contour of the display of the mobile device 540 can include a boundary. In some cases, the pose of the mobile device 540 and/or the contour, and/or boundary of the display of the mobile device 540 can be output to the AR rendering engine 575 to provide a target for displaying the AR information (e.g., AR effects, AR UI) on a display of the HMD 550.

The AR rendering module 460 can be similar to and perform similar functions to the AR rendering module 460 of FIG. 4. For example, in some implementations, the HMD 550 can include an AR effects rendering engine (e.g., AR effects rendering engine 465 of FIG. 4) and/or an AR UI rendering engine (e.g., AR UI rendering engine 470 of FIG. 4). In some cases, the AR rendering engine 575 can output AR media content to the HMD 550 with different display parameters (e.g., a different resolution, frame rate, aspect ratio, and/or any other display parameters) than the media content output from the rendering engine 515 to the mobile device 540. In some cases, by dividing the rendering functionality between a primary application 500 and a companion application 560, the computational resources for providing an AR enhanced application experience can be shared between computational resources of multiple devices such as the mobile device 540 and HMD 550. In addition, providing a separate AR rendering engine 575 in the companion application 560 can simplify development of the primary application 500. For example, the rendering engine 515 of the primary application 500 may not require maintaining compatibility with a variety of different mobile devices with different display configurations.

FIG. 6 illustrates an example configuration 600 of a video game application 610 with augmented reality enhancements. In the illustrative example of FIG. 6, the video game application 610 is displayed on a display 605 of a mobile device 640 (e.g., mobile device 440 of FIG. 4, mobile device 540 of FIG. 5). A user is depicted wearing an HMD 650 (e.g., XR system 450 of FIG. 4, HMD 550 of FIG. 5) while playing the game application 610 on the mobile device 640. The video game application can include a simulation (e.g., by simulation engine 405) of a game environment. The game environment can include, for example, a 3D simulated environment. The 3D simulated environment can include, for example, 3D models corresponding to people (e.g., players), structures, objects, terrain, or the like. The gameplay simulation can also include user 2D elements such as a UI 615. In some cases, the UI 615 can include user input controls (e.g., movement controls, inventory item selection, or the like), status information (e.g., health status, map location, inventory item content and/or quantity). However, as shown, user interface information displayed on the display of mobile device 640 can obscure visibility of the gameplay simulation of the game application 610. As illustrated in FIG. 6, the video game application 610 can be enhanced by augmented reality media elements projected by the HMD 650. For example, an extended user interface 625 can be projected relative to the display of the mobile device 640. As illustrated, the extended user interface 625 can be projected to appear parallel to a surface of the display 605, extending outside (e.g., directly below) the gameplay area of the game application 610. In some cases, a tracking engine (e.g., XR engine 220 of FIG. 2, VIO tracker 315 of FIG. 3, tracking engine 565 of FIG. 5), can determine a pose of the mobile device 640 and maintain projection of the extended user interface 625 relative to the display 605 of the mobile device 640 as the HMD and/or mobile device 640 move.

As illustrated in FIG. 6, the game application 610 and/or extended UI 625 can enhance the user experience of the video game application 610. For example, the extended UI 625 can provide additional information to the user without obscuring the display 605. In addition, the special effects 620 can increase realism of the video game application, provide a more immersive experience, augment user interaction with the gameplay environment, or the like.

Figure 7:
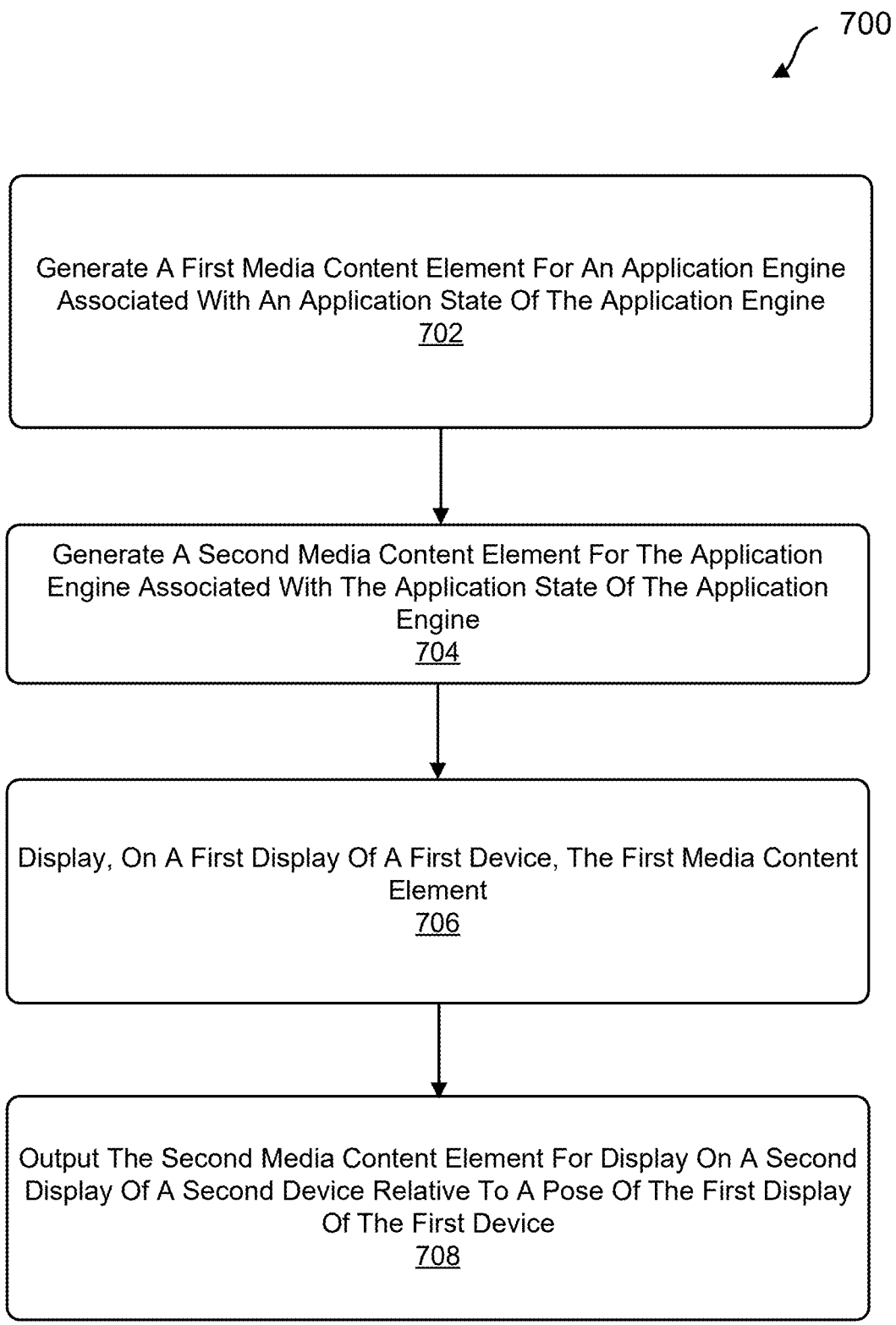
FIG. 7 is a flow diagram illustrating an example of a technique for displaying media content, in accordance with some examples.

FIG. 7 is a flow diagram illustrating an example of a process 700 for displaying media on one or more displays. At block 702, the process 700 includes generating (e.g., by a rendering engine 415, primary rendering module 420, AR rendering module 460 of FIG. 4) a first media content element for an application engine associated with an application state of the application engine. In some examples, the application state includes a 3D representation of an environment. In some aspects, generating the first media content element includes rendering the 3D representation of the environment in a first display configuration. In some examples, the first display configuration comprises at least one or more of a resolution, a refresh rate, or a color depth.

At block 704, the process 700 includes generating (e.g., by a rendering engine 415, primary rendering module 420, AR rendering module 460 of FIG. 4) a second media content element for the application engine associated with the application state of the application engine. In some cases, generating the second media content element includes rendering the 3D representation of the environment in a second display configuration. In some examples, the second display configuration is different from the first display configuration.

At block 706, the process 700 includes displaying, on a first display of a first device (e.g., mobile device 440 of FIG. 4), the first media content element.

At block 708, the process 700 includes outputting the second media content element for display on a second display of a second device (e.g., on a display of XR system 450 of FIG. 4) relative to a pose of the first display of the first device. In some cases, the second media content element includes a stereoscopic projection for a second display of the second device. In some cases, outputting the second media content element to the second device includes transmitting, by a communications link, the second media content element from the first device to the second device.

In some examples, process 700 includes obtaining pose information include at least one or more of first pose information associated with the first device or second pose information associated with the second device. In some cases, the process 700 includes determining a display area for the second media content element on the second display outside a display area of the first display based on the pose information. In some cases, the process 700 includes outputting the display area for the second media content element. In some aspects, the process 700 includes at least one or more of: determining, by the first device, a pose of the first device based on data from one or more sensors of the first device; obtaining data from one or more sensors of the second device and determining, by the first device, the pose of the first device based on the data from the one or more sensors of the second device; obtaining, from the second device, a pose of the first device; or obtaining, from the second device, a pose of the second device. In some cases, the process 700 includes determining a contour associated with the first display of the first device. In some examples, the contour associated with the first display comprises a border of the contour. In some aspects, the display area for the second media content element extends from the first display of the first display. In some examples, the display area for the second media content element extends from the border of the contour associated with the first display of the first device. In some cases, the display area for the second media content element is configured to at least partially occlude the first display of the first device when displayed on a second display of the second device (e.g., XR system 450 of FIG. 4).

In some cases, process 700 includes obtaining, at the application engine, a first input; generating, based on the first input, an additional application state, different from the application state; generating a third media content element for the application engine associated with the additional application state of the application engine; generating a fourth media content element for the application engine associated with the additional application state of the application engine; displaying, on the first display of the first device, the third media content element; and outputting the fourth media content element for display on the second display of the second device relative to an additional pose of the first device.

In some examples, process 700 includes generating the first media content element comprises a first projection of a first portion of the application state; and generating the second media content element comprises a second projection of a second portion of the application state, the second portion of the application state at least partially different from the first portion of the application state. In some aspects, the process 700 includes the second media content element comprises a user interface element.

In some cases, process 700 includes generating the first media content element and the second media content element by a renderer of the application engine.

In some implementations, the application engine includes a video gaming application. In some aspects, the first media content element comprises a first portion of a gameplay simulation of the video gaming application, in some cases, the first device comprises a handheld electronic device. In some examples, the second media content element comprises a second portion of the gameplay simulation of the video gaming application. In some cases, the second device includes an HMD. In some cases, the second display of the HMD is configured to project the second media content element relative to the first display.

Figure 8:
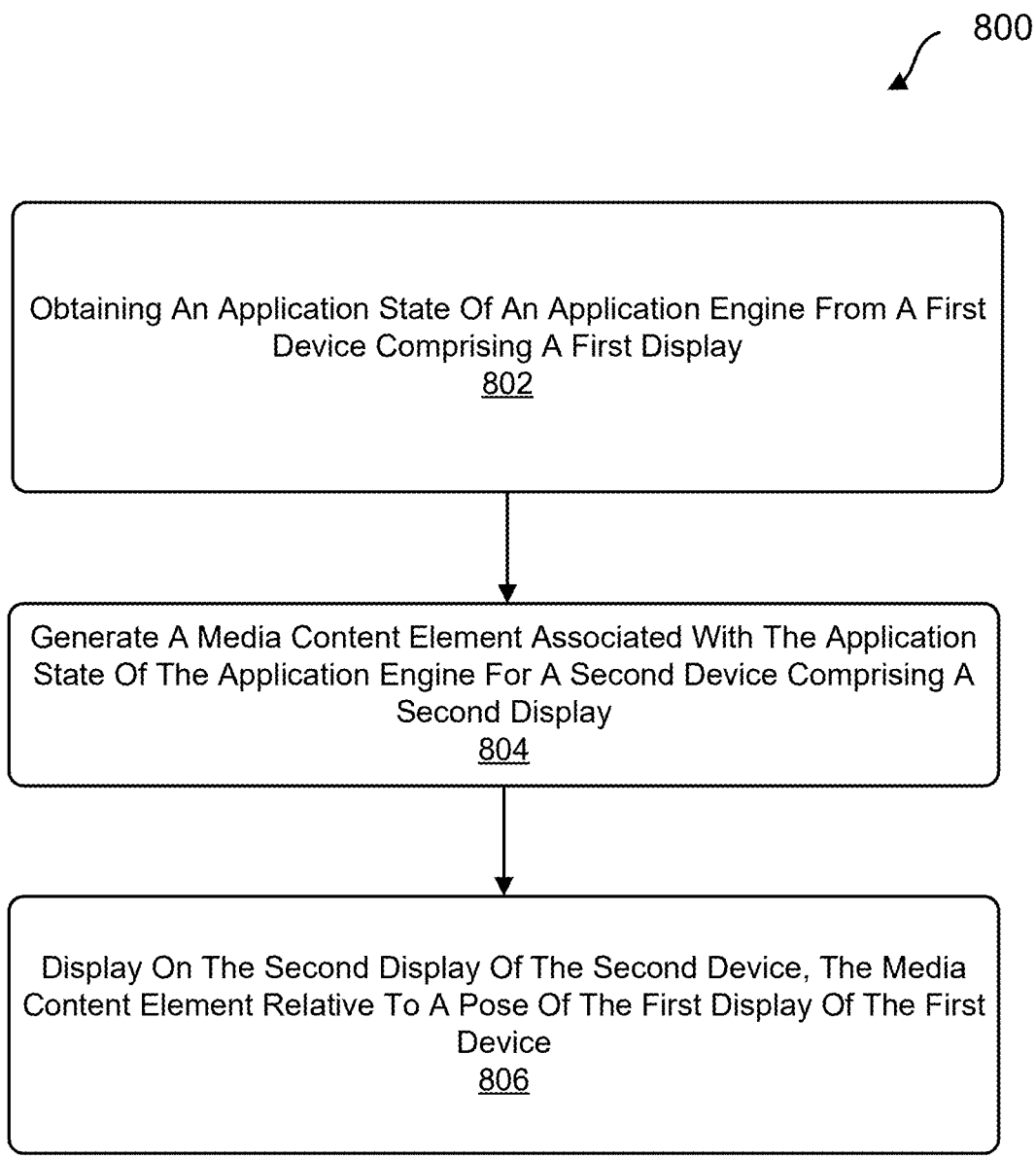
FIG. 8 is a flow diagram illustrating an example of a technique for displaying media content, in accordance with some examples.

FIG. 8 is a flow diagram illustrating an example of a process 800 for displaying media on one or more displays. At block 802, the process 800 includes obtaining an application state of an application engine (e.g., primary application 500 of FIG. 5) from a first device comprising a first display.

At block 804, the process 800 includes generating (e.g., by companion application 560, AR rendering engine 575 of FIG. 5) a media content element associated with the application state of the application engine for a second device comprising a second display.

At block 806, the process 800 includes displaying, on the second display of the second device (e.g., HMD 550 of FIG. 5) the media content element relative to a pose of the first display of the first device.

In some cases, determining the pose of the first display of the first device includes at least one or more of determining, by one or more sensors of the second device, at least one or more a pose of the first device or a pose of the second device; or obtaining pose information associated with the first device from the first device.

The process 700 illustrated in FIG. 7 may also include any operation discussed illustrated in, or discussed with respect to, the image capture and processing system 100, the image capture device 105A, the image processing device 105B, the XR system, the SLAM system 300, or a combination thereof. The image processing technique of FIG. 11 may represent at least some of the operations of an image capture and processing system 100, an image capture device 105A, an image processing device 105B, an XR system 200, a SLAM system 300, a head-mounted display (HMD) 810, a computing system 1100, or a combination thereof.

In some cases, at least a subset of the techniques illustrated by the process 700 may be performed remotely by one or more network servers of a cloud service. In some examples, the processes described herein (e.g., process 70 and/or other process(es) described herein) may be performed by a computing device or apparatus. In some examples, the process 700 can be performed by the image capture device 105A of FIG. 1. In some examples, the process 700 can be performed by the image processing device 105B of FIG. 1. The process 700 can also be performed by the image capture and processing system 100 of FIG. 1. The process 700 can also be performed by the XR system of FIG. 2, the SLAM system 300 of FIG. 3, the head-mounted display (HMD) 810 of FIGS. 9A-9B, the mobile device 1050 of FIGS. 10A-10B, a variation thereof, or a combination thereof. The process 700 can also be performed by a computing device with the architecture of the computing system 1100 shown in FIG. 11. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 700. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by block diagrams in FIG. 1 (of image capture and processing system 100), FIG. 2 (of XR system 200), FIG. 3 (of SLAM system 300), and FIG. 11 (of computing system 1100) and the flow diagram illustrating process 700 are illustrative of, or organized as, logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by block diagrams 100, 200, 300, and the flow diagram illustrating process 700 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figures 9A, 9B:
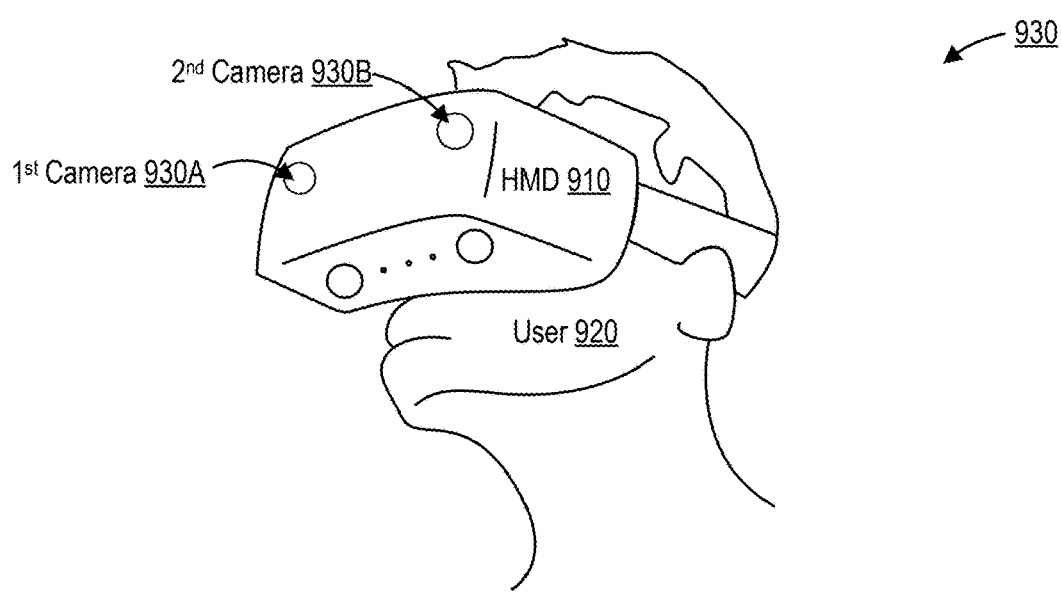
FIG. 9A is a perspective diagram illustrating a head-mounted display (HMD) that performs feature tracking and/or visual simultaneous localization and mapping (VSLAM), in accordance with some examples.
FIG. 9B is a perspective diagram illustrating a head-mounted display (HMD) of FIG. 9A being worn by a user, in accordance with some examples.

FIG. 9A is a perspective diagram 900 illustrating a head-mounted display (HMD) 910 that performs feature tracking and/or visual simultaneous localization and mapping (VSLAM), in accordance with some examples. The HMD 910 may be, for example, an augmented reality (AR)

headset, a virtual reality (VR) headset, a mixed reality (MR) headset, an extended reality (XR) headset, or some combination thereof. The HMD 910 may be an example of an XR system 200, a SLAM system 300, or a combination thereof. The HMD 910 includes a first camera 930A and a second camera 930B along a front portion of the HMD 910. The first camera 930A and the second camera 930B may be two of the one or more cameras 310. In some examples, the HMD 910 may only have a single camera. In some examples, the HMD 910 may include one or more additional cameras in addition to the first camera 930A and the second camera 930B. In some examples, the HMD 910 may include one or more additional sensors in addition to the first camera 930A and the second camera 930B.

FIG. 9B is a perspective diagram 930 illustrating the head-mounted display (HMD) 910 of FIG. 9A being worn by a user 920, in accordance with some examples. The user 920 wears the HMD 910 on the user 920's head over the user 920's eyes. The HMD 910 can capture images with the first camera 930A and the second camera 930B. In some examples, the HMD 910 displays one or more display images toward the user 920's eyes that are based on the images captured by the first camera 930A and the second camera 930B. The display images may provide a stereoscopic view of the environment, in some cases with information overlaid and/or with other modifications. For example, the HMD 910 can display a first display image to the user 920's right eye, the first display image based on an image captured by the first camera 930A. The HMD 910 can display a second display image to the user 920's left eye, the second display image based on an image captured by the second camera 930B. For instance, the HMD 910 may provide overlaid information in the display images overlaid over the images captured by the first camera 930A and the second camera 930B.

The HMD 910 includes no wheels, propellers or other conveyance of its own. Instead, the HMD 910 relies on the movements of the user 920 to move the HMD 910 about the environment. Thus, in some cases, the HMD 910, when performing a SLAM technique, can skip path planning using a path planning engine and/or movement actuation using the movement actuator. In some cases, the HMD 910 can still perform path planning using a path planning engine, and can indicate directions to follow a suggested path to the user 920 to direct the user along the suggested path planned using the path planning engine. In some cases, for instance where the HMD 910 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. If the environment is a virtual environment, then the HMD 910 can still perform path planning using the path planning engine and/or movement actuation. If the environment is a virtual environment, the HMD 910 can perform movement actuation using the movement actuator by performing a virtual movement within the virtual environment. Even if an environment is virtual, SLAM techniques may still be valuable, as the virtual environment can be unmapped and/or may have been generated by a device other than the HMD 910, such as a remote server or console associated with a video game or video game platform. In some cases, feature tracking and/or SLAM may be performed in a virtual environment even by vehicle or other device that has its own physical conveyance system that allows it to physically move about a physical environment. For example, SLAM may be performed in a virtual environment to test whether a SLAM system 300 is working properly without wasting time or energy on movement and without wearing out a physical conveyance system.

Figure 10A:
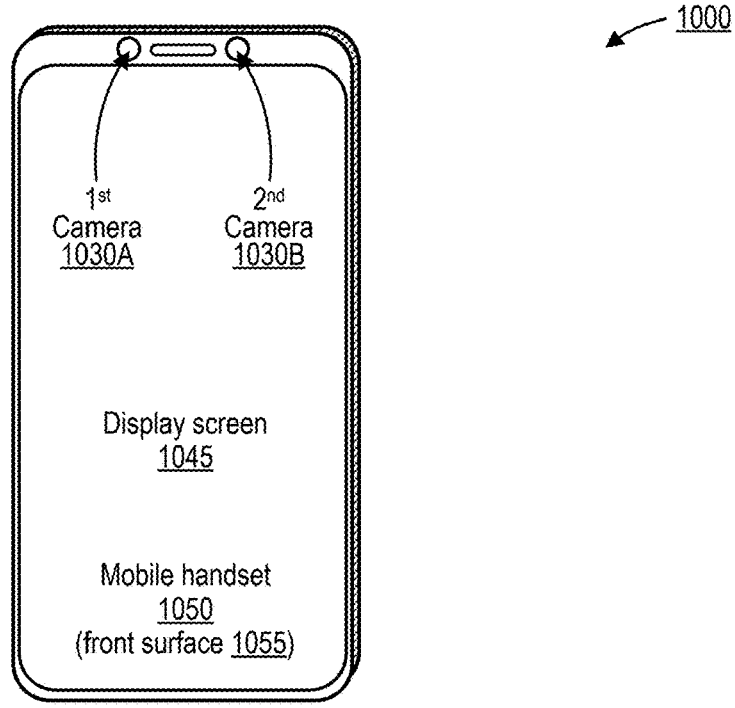
FIG. 10A is a perspective diagram illustrating a front surface of a mobile handset, in accordance with some examples.

FIG. 10A is a perspective diagram 1000 illustrating a front surface 1055 of a mobile device 1050 that performs feature tracking and/or visual simultaneous localization and mapping (VSLAM) using one or more front-facing cameras 1030A-B, in accordance with some examples. The mobile device 1050 may be, for example, a cellular telephone, a satellite phone, a portable gaming console, a music player, a health tracking device, a wearable device, a wireless communication device, a laptop, a mobile device, any other type of computing device or computing system 1100 discussed herein, or a combination thereof. The front surface 1055 of the mobile device 1050 includes a display screen 1045. The front surface 1055 of the mobile device 1050 includes a first camera 1030A and a second camera 1030B. The first camera 1030A and the second camera 1030B are illustrated in a bezel around the display screen 1045 on the front surface 1055 of the mobile device 1050. In some examples, the first camera 1030A and the second camera 1030B can be positioned in a notch or cutout that is cut out from the display screen 1045 on the front surface 1055 of the mobile device 1050. In some examples, the first camera 1030A and the second camera 1030B can be under-display cameras that are positioned between the display screen 1045 and the rest of the mobile device 1050, so that light passes through a portion of the display screen 1045 before reaching the first camera 1030A and the second camera 1030B. The first camera 1030A and the second camera 1030B of the perspective diagram 1000 are front-facing cameras. The first camera 1030A and the second camera 1030B face a direction perpendicular to a planar surface of the front surface 1055 of the mobile device 1050. The first camera 1030A and the second camera 1030B may be two of the one or more cameras 310. In some examples, the front surface 1055 of the mobile device 1050 may only have a single camera. In some examples, the mobile device 1050 may include one or more additional cameras in addition to the first camera 1030A and the second camera 1030B. In some examples, the mobile device 1050 may include one or more additional sensors in addition to the first camera 1030A and the second camera 1030B.

Figure 10B:
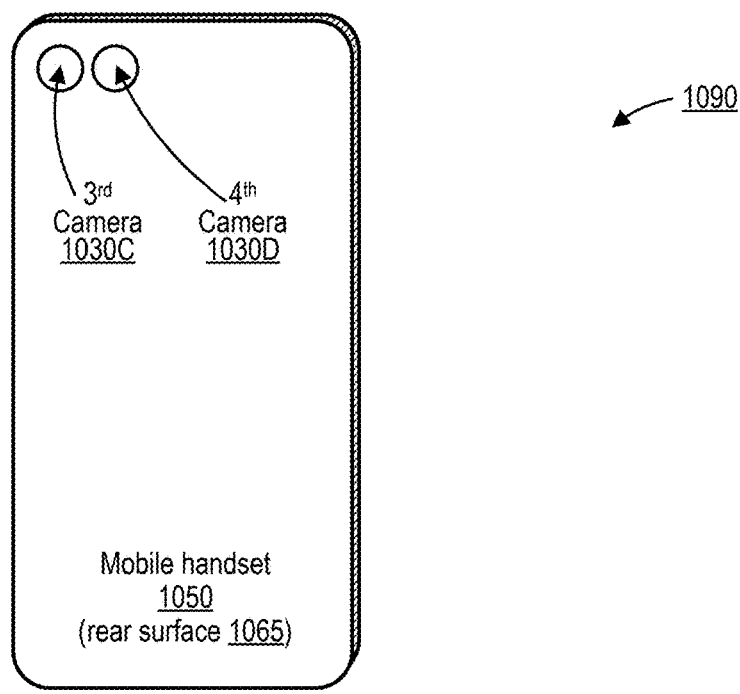
FIG. 10B is a perspective diagram illustrating a rear surface of a mobile handset, in accordance with some examples.

FIG. 10B is a perspective diagram 1090 illustrating a rear surface 1065 of a mobile device 1050. The mobile device 1050 includes a third camera 1030C and a fourth camera 1030D on the rear surface 1065 of the mobile device 1050. The third camera 1030C and the fourth camera 1030D of the perspective diagram 1090 are rear-facing. The third camera 1030C and the fourth camera 1030D face a direction perpendicular to a planar surface of the rear surface 1065 of the mobile device 1050. While the rear surface 1065 of the mobile device 1050 does not have a display screen 1045 as illustrated in the perspective diagram 1090, in some examples, the rear surface 1065 of the mobile device 1050 may have a second display screen. If the rear surface 1065 of the mobile device 1050 has a display screen 1045, any positioning of the third camera 1030C and the fourth camera 1030D relative to the display screen 1045 may be used as discussed with respect to the first camera 1030A and the second camera 1030B at the front surface 1055 of the mobile device 1050. The third camera 1030C and the fourth camera 1030D may be two of the one or more cameras 310. In some examples, the rear surface 1065 of the mobile device 1050 may only have a single camera. In some examples, the mobile device 1050 may include one or more additional cameras in addition to the first camera 1030A, the second camera 1030B, the third camera 1030C, and the fourth camera 1030D. In some examples, the mobile device 1050 may include one or more additional sensors in addition to the first camera 1030A, the second camera 1030B, the third camera 1030C, and the fourth camera 1030D.

Like the HMD 910, the mobile device 1050 includes no wheels, propellers, or other conveyance of its own. Instead, the mobile device 1050 relies on the movements of a user holding or wearing the mobile device 1050 to move the mobile device 1050 about the environment. Thus, in some cases, the mobile device 1050, when performing a SLAM technique, can skip path planning using the path planning engine and/or movement actuation using the movement actuator. In some cases, the mobile device 1050 can still perform path planning using the path planning engine and can indicate directions to follow a suggested path to the user to direct the user along the suggested path planned using the path planning engine. In some cases, for instance where the mobile device 1050 is used for AR, VR, MR, or XR, the environment may be entirely or partially virtual. In some cases, the mobile device 1050 may be slotted into a head-mounted device (HMD) (e.g., into a cradle of the HMD) so that the mobile device 1050 functions as a display of the HMD, with the display screen 1045 of the mobile device 1050 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1050. The movement actuator may include any such input device. Movement through the virtual environment may not require wheels, propellers, legs, or any other form of conveyance. If the environment is a virtual environment, then the mobile device 1050 can still perform path planning using the path planning engine and/or movement actuation. If the environment is a virtual environment, the mobile device 1050 can perform movement actuation using the movement actuator by performing a virtual movement within the virtual environment.

FIG. 11 is a diagram illustrating an example of a system for implementing certain aspects of the present technology. In particular, FIG. 11 illustrates an example of computing system 1100, which can be for example any computing device making up the image capture and processing system 100, the image capture device 105A, the image processing device 105B, the XR system, the SLAM system 300, a remote computing system, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A method for displaying media on one or more displays comprising: generating a first media content element for an application engine associated with an application state of the application engine; generating a second media content element for the application engine associated with the application state of the application engine; displaying, on a first display of a first device, the first media content element; and outputting the second media content element for display on a second display of a second device relative to a pose of the first display of the first device.

Aspect 2. The method of Aspect 1, further comprising: obtaining pose information comprising at least one or more of first pose information associated with the first device or second pose information associated with the second device; determining a display area for the second media content element on the second display outside a display area of the first display based on the pose information; and outputting the display area for the second media content element.

Aspect 3. The method of any of Aspects 1 to 2, wherein obtaining the first pose information comprises at least one or more of: determining, by the first device, a pose of the first device based on data from one or more sensors of the first device; by the first device, the pose of the first device based on the data from the one or more sensors of the second device; obtaining, from the second device, a pose of the first device; or obtaining, from the second device, a pose of the second device.

Aspect 4. The method of any of Aspects 1 to 3, further comprising: determining a contour associated with the first display of the first device, wherein the contour associated with the first display comprises a border of the contour and wherein the display area for the second media content element extends from the first display of the first display.

Aspect 5. The method of any of Aspects 1 to 4, wherein the display area for the second media content element extends from the border of the contour associated with the first display of the first device.

Aspect 6. The method of any of Aspects 1 to 5, wherein the display area for the second media content element is configured to at least partially occlude the first display of the first device when displayed on a second display of the second device.

Aspect 7. The method of any of Aspects 1 to 6, wherein the second media content element comprises a stereoscopic projection for the second display of the second device.

Aspect 8. The method of any of Aspects 1 to 7, wherein the application state comprises a three-dimensional (3D) representation of an environment.

Aspect 9. The method of any of Aspects 1 to 8, wherein generating the first media content element comprises rendering the 3D representation of the environment in a first display configuration, wherein the first display configuration comprises at least one or more of a resolution, a refresh rate, or a color depth.

Aspect 10. The method of any of Aspects 1 to 9, wherein generating the second media content element comprises rendering the 3D representation of the environment in a second display configuration, wherein the second display configuration is different from the first display configuration.

Aspect 11. The method of any of Aspects 1 to 10, further comprising; obtaining, at the application engine, a first input; generating, based on the first input, an additional application state, different from the application state; generating a third media content element for the application engine associated with the additional application state of the application engine; generating a fourth media content element for the application engine associated with the additional application state of the application engine; displaying, on the first display of the first device, the third media content element; and outputting the fourth media content element for display on the second display of the second device relative to an additional pose of the first device.

Aspect 12. The method of any of Aspects 1 to 11, wherein: generating the first media content element comprises a first projection of a first portion of the application state; and generating the second media content element comprises a second projection of a second portion of the application state, the second portion of the application state at least partially different from the first portion of the application state.

Aspect 13. The method of any of Aspects 1 to 12, wherein the second media content element comprises a user interface element.

Aspect 14. The method of any of Aspects 1 to 13, further comprising generating the first media content element and the second media content element by a renderer of the application engine.

Aspect 15. The method of any of Aspects 1 to 14, wherein outputting the second media content element to the second device comprises transmitting, by a communications link, the second media content element from the first device to the second device.

Aspect 16. The method of any of Aspects 1 to 15, wherein: the application engine comprises a video gaming application; the first media content element comprises a first portion of a gameplay simulation of the video gaming application; the first device comprises a handheld electronic device; the second media content element comprises a second portion of the gameplay simulation of the video gaming application; and the second device comprises a head-mounted display (HMD), wherein the second display of the HMD is configured to project the second media content element relative to the first display.

Aspect 17. A method for displaying media on one or more displays comprising: obtaining an application state of an application engine from a first device comprising a first display; generating a media content element associated with the application state of the application engine for a second device comprising a second display; and displaying, on the second display of the second device, the media content element relative to a pose of the first display of the first device.

Aspect 18. The method of Aspect 17, wherein determining the pose of the first display of the first device comprises at least one or more of: determining, by one or more sensors of the second device, at least one or more a pose of the first device or a pose of the second device; or obtaining pose information associated with the first device from the first device.

Aspect 19. An apparatus for displaying media on one or more displays comprising: a memory; and one or more processors coupled to the memory and configured to: generate a first media content element for an application engine associated with an application state of the application engine; generate a second media content element for the application engine associated with the application state of the application engine; display, on a first display of a first device, the first media content element; and output the second media content element for display on a second display of a second device relative to a pose of the first display of the first device.

Aspect 20. The apparatus of Aspect 19, wherein, to obtain pose information comprising at least one or more of first pose information associated with the first device or second pose information associated with the second device, the one or more processors are configured to: determine a display area for the second media content element on the second display outside a display area of the first display based on the pose information; and output the display area for the second media content element.

Aspect 21. The apparatus of any of Aspects 19 to 20, wherein, to obtain the first pose information the one or more processors are configured to: determine, by the first device, a pose of the first device based on data from one or more sensors of the first device; by the first device, the pose of the first device based on the data from the one or more sensors of the second device; obtain, from the second device, a pose of the first device; or obtain, from the second device, a pose of the second device.

Aspect 22. The apparatus of any of Aspects 19 to 21, wherein the one or more processors are configured to determine a contour associated with the first display of the first device, wherein the contour associated with the first display comprises a border of the contour and wherein the display area for the second media content element extends from the first display of the first display.

Aspect 23. The apparatus of any of Aspects 19 to 22, wherein the display area for the second media content element extends from the border of the contour associated with the first display of the first device.

Aspect 24. The apparatus of any of Aspects 19 to 23, wherein the display area for the second media content element is configured to at least partially occlude the first display of the first device when displayed on a second display of the second device.

Aspect 25. The apparatus of any of Aspects 19 to 24, wherein the second media content element comprises a stereoscopic projection for the second display of the second device.

Aspect 26. The apparatus of any of Aspects 19 to 25, wherein the application state comprises a 3D representation of an environment.

Aspect 27. The apparatus of any of Aspects 19 to 26, wherein, to generate the first media content element, the one or more processors are configured to render the 3D representation of the environment in a first display configuration, wherein the first display configuration comprises at least one or more of a resolution, a refresh rate, or a color depth.

Aspect 28. The apparatus of any of Aspects 19 to 27, wherein, to generate the second media content element, the one or more processors are configured to render the 3D representation of the environment in a second display configuration, wherein the second display configuration is different from the first display configuration.

Aspect 29. The apparatus of any of Aspects 19 to 28, wherein the one or more processors are configured to: obtain, at the application engine, a first input; generate, based on the first input, an additional application state, different from the application state; generate a third media content element for the application engine associated with the additional application state of the application engine; generate a fourth media content element for the application engine associated with the additional application state of the application engine; display, on the first display of the first device, the third media content element; and output the fourth media content element for display on the second display of the second device relative to an additional pose of the first device.

Aspect 30. The apparatus of any of Aspects 19 to 29, wherein the one or more processors are configured to: generate the first media content element, wherein the first media content element comprises a first projection of a first portion of the application state; and generate the second media content element, wherein the second media content element comprises a second projection of a second portion of the application state, the second portion of the application state at least partially different from the first portion of the application state.

Aspect 31. The apparatus of any of Aspects 19 to 30, wherein the second media content element comprises a user interface element.

Aspect 32. The apparatus of any of Aspects 19 to 31, wherein the one or more processors are configured to generate the first media content element and the second media content element by a renderer of the application engine.

Aspect 33. The apparatus of any of Aspects 19 to 32, wherein, to output the second media content element to the second device the one or more processors are configured to, by a communications link, transmit the second media content element from the first device to the second device.

Aspect 34. The apparatus of any of Aspects 19 to 33, wherein: the application engine comprises a video game application; the first media content element comprises a first portion of a gameplay simulation of the video game application; the first device comprises a handheld electronic device; the second media content element comprises a second portion of the gameplay simulation of the video game application; and the second device comprises a head-mounted display (HMD), wherein the second display of the HMD is configured to project the second media content element relative to the first display.

Aspect 35. An apparatus for displaying media on one or more displays comprising: a memory; and one or more processors coupled to the memory and configured to: obtain an application state of an application engine from a first device comprising a first display; generate a media content element associated with the application state of the application engine for a second device comprising a second display; and display, on the second display of the second device, the media content element relative to a pose of the first display of the first device.

Aspect 36. The apparatus of Aspect 35, wherein, to determine the pose of the first display of the first device, the one or more processors are configured to: determine, by one or more sensors of the second device, at least one or more a pose of the first device or a pose of the second device; or obtain pose information associated with the first device from the first device.

Aspect 37: A non-transitory computer-readable storage medium having stored thereon instructions which, when executed by one or more processors, cause the one or more processors to perform any of the operations of aspects 1 to 36.

Aspect 38: An apparatus comprising means for performing any of the operations of aspects 1 to 36.

Aspect 39: A method comprising operations according to any of Aspects 1 to 16 and any of Aspects 17 to 18.

Aspect 40: An apparatus for displaying media on one or more displays. The apparatus includes a memory (e.g., implemented in circuitry) configured and one or more processors (e.g., one processor or multiple processors) coupled to the memory. The one or more processors are configured to perform operations according to any of Aspects 1 to 16 and any of Aspects 17 to 18.

Aspect 41: A computer-readable storage medium storing instructions that, when executed by one or more processors, cause the one or more processors to perform operations according to any of Aspects 1 to 16 and any of Aspects 17 to 18.

Aspect 42: An apparatus comprising means for performing operations according to any of Aspects 1 to 16 and any of Aspects 17 to 18.

What is claimed is:

1. A method for displaying media on one or more displays comprising:
   obtaining a 3D representation of a 3D environment simulation of an application engine from a first device comprising a first display, wherein a 2D representation of the 3D environment simulation is displayed by the first display;
   outputting, by a communications link, an application state of the 3D environment simulation, the application state of the 3D environment simulation being different from the 2D representation of the 3D environment simulation;
   generating, by a companion application, a media content element based on the application state of the 3D environment simulation of the application engine for display by a second device comprising a second display, the companion application being different from the application engine; and
   displaying, by the second display of the second device, the media content element relative to a pose of the first display of the first device.

2. The method of claim 1, wherein determining the pose of the first display of the first device comprises at least one or more of:
   determining, by one or more sensors of the second device, at least one or more of a pose of the first device or a pose of the second device; or
   obtaining, from the first device, pose information associated with the first device.

3. The method of claim 1, further comprising:
   obtaining pose information comprising at least one or more of first pose information associated with the first device or second pose information associated with the second device; and
   determining a display area for the media content element on the second display outside a display area of the first display based on the pose information.

4. The method of claim 3, wherein obtaining the first pose information comprises at least one or more of:
   determining, by the first device, a pose of the first device based on data from one or more sensors of the first device;
   obtaining data from one or more sensors of the second device and determining, by the first device, the pose of the first device based on the data from the one or more sensors of the second device;
   obtaining, from the second device, a pose of the first device; or
   obtaining, from the second device, a pose of the second device.

5. The method of claim 3, further comprising:
   determining a contour associated with the first display of the first device, wherein the contour associated with the first display comprises a border of the contour and wherein the display area for the media content element extends from the first display of the first device.

6. The method of claim 5, wherein the display area for the media content element extends from the border of the contour associated with the first display of the first device.

7. The method of claim 3, wherein the display area for the media content element is configured to at least partially occlude the first display of the first device when displayed on a second display of the second device.

8. The method of claim 1, wherein the media content element comprises a stereoscopic projection for the second display of the second device.

9. The method of claim 1, wherein the application state comprises a three-dimensional (3D) representation of an environment.

10. The method of claim 9, further comprising rendering the 3D representation of the environment in a first display configuration of the first display, wherein the first display configuration comprises at least one or more of a resolution, a refresh rate, or a color depth.

11. The method of claim 10, wherein generating the media content element comprises rendering the 3D representation of the environment in a second display configuration, wherein the second display configuration is different from the first display configuration.

12. The method of claim 1, further comprising;
   obtaining, at the application engine, a first input;
   generating, based on the first input, an additional application state, different from the application state;
   generating a third media content element for the application engine associated with the additional application state of the application engine;
   generating a fourth media content element for the application engine associated with the additional application state of the application engine;
   displaying, on the first display of the first device, the third media content element; and
   outputting the fourth media content element for display on the second display of the second device relative to an additional pose of the first device.

13. The method of claim 1, wherein generating the media content element comprises generating a projection of a portion of the application state.

14. The method of claim 1, wherein the media content element comprises a user interface element.

15. The method of claim 1, further comprising generating the media content element by a renderer of the companion application.

16. The method of claim 15, wherein outputting the application state of the 3D environment simulation comprises transmitting, by a communications link, the application state from the first device to the second device.

17. An apparatus for displaying media on one or more displays comprising:
   a memory; and
   one or more processors coupled to the memory and configured to:
      obtain a 3D representation of a 3D environment simulation of an application engine from a first device comprising a first display, wherein a 2D representation of the 3D environment simulation is displayed by the first display;
      output, by a communications link, an application state of the 3D environment simulation, the application state of the 3D environment simulation being different from the 2D representation of the 3D environment simulation;
      generate, by a companion application, a media content element based on the application state of the 3D environment simulation for display by a second device comprising a second display, the companion application being different from the application engine; and
      display, by the second display of the second device, the media content element relative to a pose of the first display of the first device.

18. The apparatus of claim 17, wherein, to determine the pose of the first display of the first device, the one or more processors are configured to:
- determine, by one or more sensors of the second device, at least one or more of a pose of the first device or a pose of the second device; or
- obtain, from the first device, pose information associated with the first device.

19. The apparatus of claim 17, wherein the one or more processors are further configured to:
- obtain pose information comprising at least one or more of first pose information associated with the first device or second pose information associated with the second device; and
- determine a display area for the media content element on the second display outside a display area of the first display based on the pose information.

20. The apparatus of claim 19, wherein obtaining the first pose information comprises at least one or more of:
- determining, by the first device, a pose of the first device based on data from one or more sensors of the first device;
- obtaining data from one or more sensors of the second device and determining, by the first device, the pose of the first device based on the data from the one or more sensors of the second device;
- obtaining, from the second device, a pose of the first device; or
- obtaining, from the second device, a pose of the second device.

21. The apparatus of claim 19, wherein the one or more processors are further configured to:
- determine a contour associated with the first display of the first device, wherein the contour associated with the first display comprises a border of the contour and wherein the display area for the media content element extends from the first display of the first device.

22. The apparatus of claim 21, wherein the display area for the media content element extends from the border of the contour associated with the first display of the first device.

23. The apparatus of claim 19, wherein the display area for the media content element is configured to at least partially occlude the first display of the first device when displayed on a second display of the second device.

24. The apparatus of claim 17, wherein the media content element comprises a stereoscopic projection for the second display of the second device.

25. The apparatus of claim 17, wherein the application state comprises a three-dimensional (3D) representation of an environment.

26. The apparatus of claim 25, wherein the one or more processors are further configured to:
- render the 3D representation of the environment in a first display configuration of the first display, wherein the first display configuration comprises at least one or more of a resolution, a refresh rate, or a color depth.

27. The apparatus of claim 26, wherein generating the media content element comprises rendering the 3D representation of the environment in a second display configuration, wherein the second display configuration is different from the first display configuration.

28. The apparatus of claim 17, wherein the one or more processors are further configured to:
- obtain, at the application engine, a first input;
- generate, based on the first input, an additional application state different from the application state;
- generate a third media content element for the application engine associated with the additional application state of the application engine;
- generate a fourth media content element for the application engine associated with the additional application state of the application engine;
- display, on the first display of the first device, the third media content element; and
- output the fourth media content element for display on the second display of the second device relative to an additional pose of the first device.

29. The apparatus of claim 17, wherein generating the media content element comprises generating a projection of a portion of the application state.

30. The apparatus of claim 17, wherein the media content element comprises a user interface element.

31. The apparatus of claim 17, wherein the one or more processors are further configured to generate the media content element by a renderer of the companion application.

32. The apparatus of claim 31, wherein outputting the application state of the 3D environment simulation comprises transmitting, by a communications link, the application state from the first device to the second device.

* * * * *